United States Patent
Lagarde et al.

(10) Patent No.: US 10,626,669 B2
(45) Date of Patent: Apr. 21, 2020

(54) METHOD FOR CONTROLLING AN ACTUATOR FOR A BUILDING MOVABLE EQUIPMENT

(71) Applicant: SOMFY SAS, Cluses (FR)

(72) Inventors: Eric Lagarde, Sallanches (FR); Norbert Dupielet, Sallanches (FR); Frederic Maraval, Passy (FR); Fabien Rousseau, Mieussy (FR); Pierre Emmanuel Cavarec, Mont Saxonnex (FR); Pierre Geriniere, Cluses (FR); Serge Neuman, Seynod (FR)

(73) Assignee: SOMFY SAS, Cluses (FR)

( * ) Notice: Subject to any disclaimer, the term of this patent is extended or adjusted under 35 U.S.C. 154(b) by 200 days.

(21) Appl. No.: 14/654,828

(22) PCT Filed: Dec. 16, 2013

(86) PCT No.: PCT/FR2013/053105
§ 371 (c)(1),
(2) Date: Jun. 22, 2015

(87) PCT Pub. No.: WO2014/096664
PCT Pub. Date: Jun. 26, 2014

(65) Prior Publication Data
US 2015/0345217 A1    Dec. 3, 2015

(30) Foreign Application Priority Data
Dec. 21, 2012 (FR) ........................ 12 62551

(51) Int. Cl.
*E06B 9/68* (2006.01)
*G05B 13/04* (2006.01)
*G05B 15/02* (2006.01)

(52) U.S. Cl.
CPC ............ *E06B 9/68* (2013.01); *G05B 13/04* (2013.01); *G05B 15/02* (2013.01);
(Continued)

(58) Field of Classification Search
CPC ... E06B 9/68; E06B 2009/6818; G05B 13/04; G05B 15/02; G05B 2219/163; G05B 2219/25011; G05B 2219/2642
See application file for complete search history.

(56) References Cited

U.S. PATENT DOCUMENTS

| 8,417,388 B2 * | 4/2013 | Altonen ............... E06B 9/68 160/5 |
| 2005/0213082 A1 | 9/2005 | DiBernardo et al. |

(Continued)

FOREIGN PATENT DOCUMENTS

| DE | 102005032550 A1 | 1/2007 |
| WO | 2012073161 A1 | 6/2012 |

OTHER PUBLICATIONS

International Search Report dated Aug. 13, 2014 re: Application No. PCT/FR2013/053105; citing: DE 10 2005 032550 A1, Zakharov et al. "Locating Geographical Coordinates . . . ", US 2005/213082 A1 and WO 2012/073161 A1.
Mikhail Zakharov "Locating Georgraphical Coordinates Using Observations over the Sun and Polaris Positions", Internet, Jan. 1, 2012, XP002712117; http://www.forskningsradet.no/servlet/.

*Primary Examiner* — James J Lee
*Assistant Examiner* — Christopher W Carter
(74) *Attorney, Agent, or Firm* — Cantor Colburn LLP

(57) ABSTRACT

The present invention relates to a method of controlling an actuator for a mobile item of equipment in building comprising the steps consisting in: deploying a model (M) linking at least one modelling parameter (P) with at least one characteristic physical quantity (C) of the environment or of the operation of the actuator exhibiting a temporal evolution; collecting a set of measurement values (VCm) relating to the
(Continued)

at least one characteristic physical quantity (C) of the environment or of the operation of the actuator in the course of a measurement interval (Tm), each measurement value (VCm) being associated with an instant (Tm) of the measurement interval (Tm); determining or correcting at least one value (VP) of the at least one modelling parameter (P) in such a way that a modelled temporal evolution (Ee) defined on the basis of the application of the model (M) of the at least one value (VP) of modelling parameter (P) corresponds to or approaches an observed temporal evolution (Eo) of the characteristic physical quantity (C) determined on the basis of the set of measurement values (VCm); applying or correcting a definition of the operation of the actuator (1) as a function of a determined or corrected value (VP) of the at least one parameter (P). The present invention also relates to an actuator implementing such a method.

22 Claims, 3 Drawing Sheets

(52) U.S. Cl.
CPC .............. *E06B 2009/6818* (2013.01); *G05B 2219/163* (2013.01); *G05B 2219/25011* (2013.01); *G05B 2219/2642* (2013.01)

(56) References Cited

U.S. PATENT DOCUMENTS

| | | | |
|---|---|---|---|
| 2009/0222137 A1* | 9/2009 | Berman | E06B 9/322 700/275 |
| 2010/0071856 A1* | 3/2010 | Zaharchuk | E05F 17/00 160/5 |
| 2012/0173468 A1* | 7/2012 | Gillam | G06N 3/126 706/13 |
| 2014/0052300 A1* | 2/2014 | Matsuoka | G05D 23/1917 700/276 |

\* cited by examiner

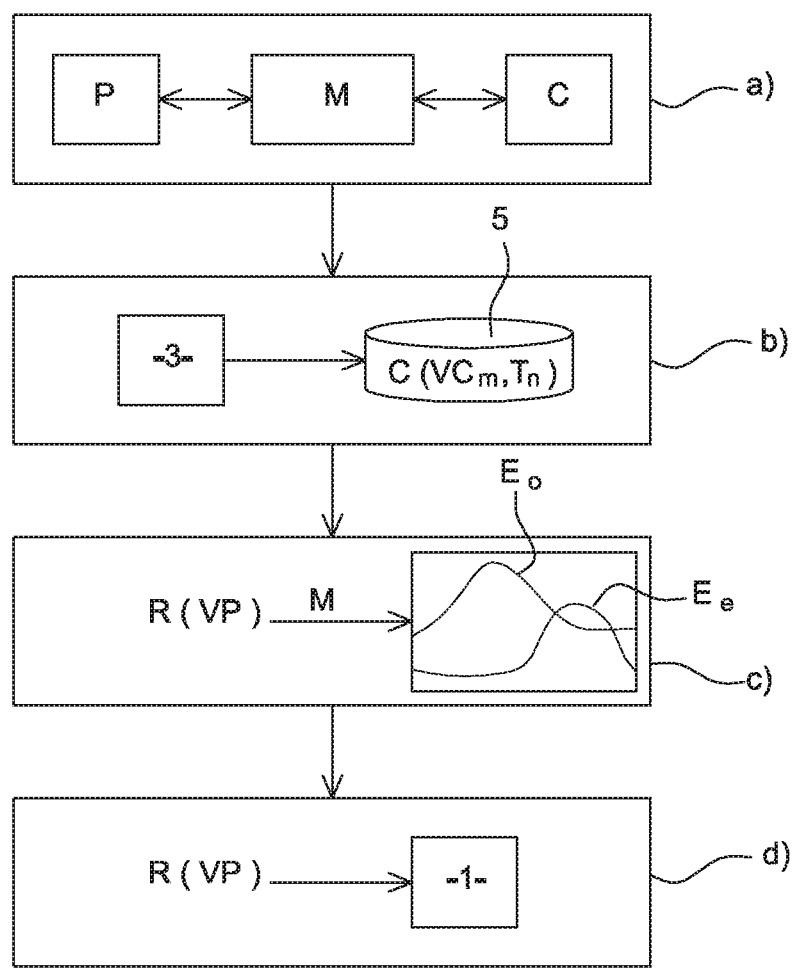
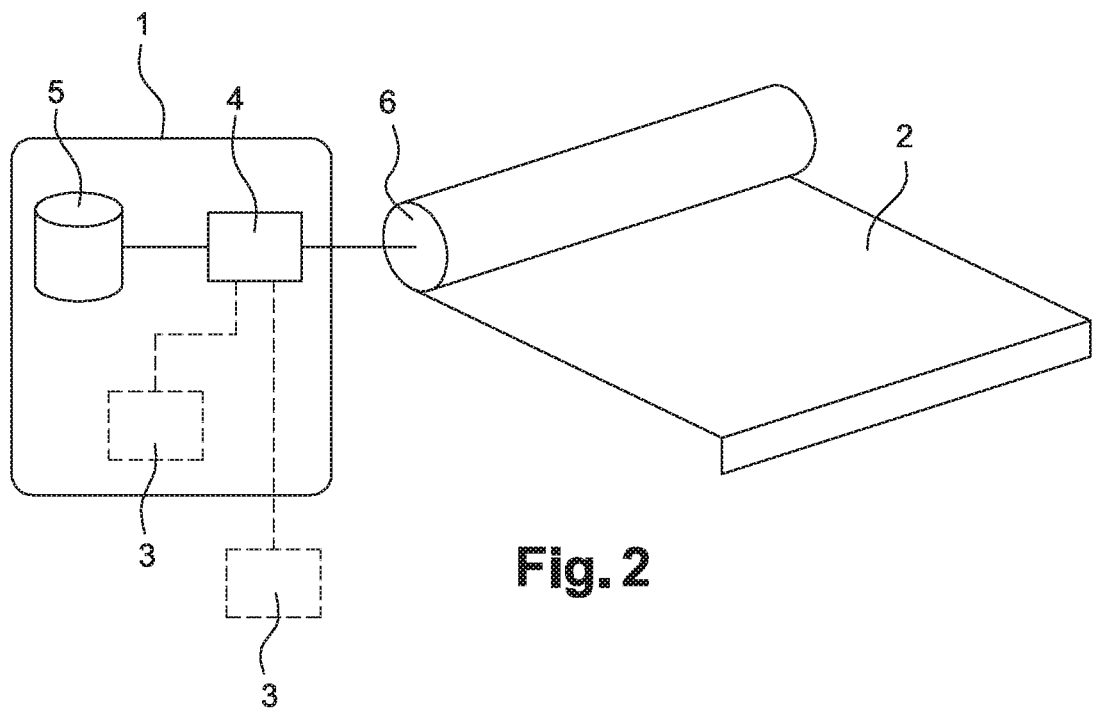

METHOD FOR CONTROLLING AN ACTUATOR FOR A BUILDING MOVABLE EQUIPMENT

TECHNICAL FIELD

The present invention concerns the field of building automation and, more specifically, the invention concerns a method for controlling an actuator of a building movable equipment as well as an actuator of a building movable equipment arranged to implement such a control method.

BACKGROUND

In order to define the operation of the actuator associated to a building movable equipment, a set of parameters related to the environment of both the equipment and the actuator should be defined.

As example, it may be desired to know the luminosity or the temperature, as well as the actual hour in order to define an appropriate command. Consequently, in order to allow obtaining a precise control, it is necessary to equip the actuator with sensors intended to collect measurement data or other equipment such as a clock allowing to determine the value of the parameters and the control scenarios to be applied.

The multiplication of these components leads to make the constitution of the actuator more complex and requires moreover adjustments and calibration.

BRIEF SUMMARY

The present invention aims to resolve all or part of the above-mentioned drawbacks.

To this end, the present invention relates to a method for controlling an actuator of a building movable equipment comprising:

a) Providing a model relating at least one modeling parameter to at least one characteristic physical quantity of the environment or of the operation of the actuator presenting a temporal evolution;

b) Collecting a set of measurement values related to the at least one characteristic physical quantity of the environment or of the operation of the actuator during a measurement interval, each measurement value being associated to a time of the measurement interval;

c) Determining or correcting at least one value of the at least one modeling parameter so that a modeled temporal evolution defined from the application of the model to the at least one value of the modeling parameter corresponds or is close to an observed temporal evolution of the characteristic physical quantity determined from the set of measurement values;

d) Applying or correcting a definition of an operation of the actuator depending on the at least one value of the at least one parameter determined or corrected in step c).

Thanks to the arrangements according to the invention, an adaptation of the parameters, defining the model, may be carried out depending on a set of measurements extending over a time interval, so as to ensure higher precision of the control of the movable equipment corresponding with its environment or still to adapt its operation in order to optimize its comfort of use.

These arrangements also allow limiting the number of types of characteristic physical quantities to be measured, thanks to the collected information on the temporal evolution of the measured characteristic physical quantitie(s).

The use of a model allows eliminating the need for a calibration step based on an empirical use of the actuator by a user, this theoretical or predetermined model defining a modeled temporal evolution which provides a set of theoretical values over a given time period.

According to an implementation of the method, the set of measurement values may comprises measurement values collected by a physical sensor.

According to another implementation of the method, the set of measurement values comprises, alternatively to or complementarily to the values collected by a physical sensor, measurement values related to actions of the user.

According to an implementation of the method, the measurement values related to actions of the user correspond to control instructions input by the user.

These arrangements allow deducing the at least one physical quantity depending on the behavior of the user relatively to the command of the movable equipment.

Thus, the instructions of the user may be considered either as measurement values allowing to initially determine an operation of the actuator, or as an element allowing to correct a control law established for the operation of the actuator.

According to an implementation of the method, the used model takes into account at least one harmonic modeling of the evolution of the at least one characteristic physical quantity.

These arrangements allow taking into account the periodicity or the pseudo-periodicity of the evolution of the at least one characteristic physical quantity. In particular, the different superimposed time periods may correspond to diurnal alternations, and/or to annual alternations and/or to alternations over a few days.

According to an implementation of the method, the set of measurement values comprises values corresponding to a characteristic physical quantity of insolation/received solar power and/or ambient temperature.

According to an implementation of the method, the at least one parameter corresponds to an estimation of a geographical position, and/or an orientation relative to a geographical reference frame, and/or the hour or the date.

According to an implementation of the method, step c) comprises the use of a probabilistic algorithm.

The use of a probabilistic-type algorithm allows taking into account massive sets of measurement data which potentially comprise aberrant measurement data in order to define a satisfactory estimation of the parameters of the model.

According to an implementation of the method, the probabilistic algorithm comprises an evolutionary algorithm, in particular a genetic-type algorithm, which comprises a step of defining a population of individuals, each individual corresponding to a data structure combining potential values of the at least one parameter.

According to an implementation of the method, the evolutionary algorithm comprises a step of evaluating a performance function corresponding to calculating a deviation between:

a modeled temporal evolution of the at least one characteristic quantity defined by applying the model to the at least one potential value of the at least one parameter, on the one hand, and the observed temporal evolution of the characteristic physical quantity determined from the set of measurement values, on the other hand.

According to an implementation of the method, the probabilistic algorithm comprises an algorithm of the simulated annealing type.

According to an implementation of the method, the probabilistic algorithm comprises a Bayesian inference.

According to an implementation of the method, the probabilistic algorithm comprises an initial learning phase comprising scaling the set of measurement values of the at least one characteristic quantity.

According to an implementation of the method, step c) comprises a signal processing step, in particular a derivative calculation or filtering step, on the set of measurement values of the at least one characteristic quantity.

According to an aspect of the invention, step c) comprises a step of calculating the deviation of the patterns of a signal formed by the set of measurement values presenting a given periodicity.

According to an aspect of the invention, the signal processing step and/or the step of calculating deviation of the patterns is carried out prior to the application of a probabilistic algorithm.

According to an implementation of the method, the definition of an operation of the actuator comprises the definition of a command for positioning the movable equipment.

According to an implementation of the method, the correction of the definition of a positioning command corresponds to the correction of a triggering schedule of a positioning command, in particular a command for opening a movable equipment.

According to an implementation of the method, the step d) comprises the steps comprising:
  determining a relative orientation of the movable equipment with respect to the sun depending on the at least one parameter value;
  applying a command for positioning the movable equipment depending on the determined relative orientation.

According to an implementation of the method, the definition of an operation of the actuator comprises the definition of a command for varying the speed of the actuator.

The present invention also relates to an actuator of a building movable equipment arranged to implement a control method as described above comprising a sensor and/or a user interface arranged to collect measurement values of the at least one characteristic physical quantity.

BRIEF DESCRIPTION OF THE DRAWINGS

Anyway, the invention will be better understood upon reading the following description, with reference to the appended schematic drawing representing, as a non-limiting example, the steps of a method according to the invention as well as an actuator implementing this method.

FIG. 1 is an overview diagram of the steps of the method according to the invention.

FIG. 2 illustrates an actuator for a building movable equipment, the actuator comprising a temperature sensor.

DETAILED DESCRIPTION

Figure 3:
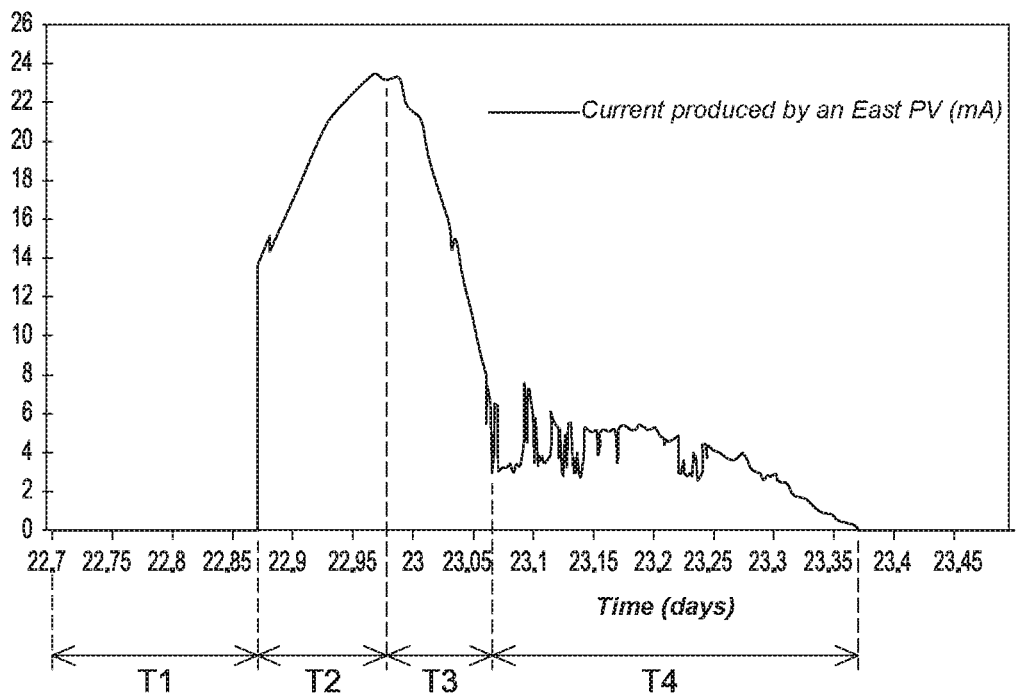
FIG. 3 is a graph illustrating an example of collection of a set of measurement values representative of insolation carried out during a determined measurement interval.

As is schematically represented in FIG. 2, an actuator 1 of a building movable equipment 2 comprises a motor 6 intended to apply a positioning command to a building movable equipment 2, and a unit or other means for checking or processing data 4 allowing processing data coming from a sensor 3 and determining a positioning command to be applied by the motor 6.

The sensor 3 is intended to collect measurement values VCm of at least one characteristic physical quantity C of the environment of the actuator 1.

The sensor 3 may be integrated in the actuator 1 or still it may be a separate entity communicating with the actuator 1.

The control unit 4 is associated to one or several storage memorie(s) 5.

It is to be noted that by movable equipment, it is meant in particular shutters for a window, for example shutters presenting hinged shutters, roller shutters, internal and/or external venetian blinds or still windows or hatches for natural ventilation.

The at least one considered characteristic physical quantity C of the environment of the movable equipment presents a temporal evolution E, and may, for example, comprise temperature, insolation or solar power or still any other physical quantity likely to be measured by a physical sensor 3 and/or related to inputs entered via a user interface.

The user interface allows directly inputting measurement values of a characteristic physical quantity C of the environment or the operation of the actuator 1 or still inputting a manual counter command during the execution of an automatic control instruction of the actuator 1.

As is illustrated in FIG. 1, a method for controlling the actuator 1 comprises a first step a) of providing a model M relating at least one modeling parameter P to the at least one characteristic physical quantity C of the environment or the operation of the actuator 1 presenting a temporal evolution E.

The at least one parameter P related to the environment of the actuator 1 may, for example, correspond to:
  geographical coordinates of the sensor 3, in particular its latitude and its longitude,
  the orientation of the sensor 3 with respect to the sun,
  the universal time.

In the case of a building movable equipment 2 constituted by an opening panel, and in the case where the opening panel is likely to occasionally hide the sensor 3, then the at least one parameter P may also correspond to:
  a thermal resistance of the opening panel 2, and/or
  a probable opening or closing time of the opening panel 2.

The at least one parameter P related to the operation of the actuator 1 may, for example, correspond to:
  the presence of one or several hard point(s) when unwinding or winding the movable equipment 2,
  a manual command of a user in the absence of an automatic command for opening/closing the opening panel 2.

The used model M may be in different mathematical or physical types capable of establishing a relationship between the at least one modeling parameter P and the at least one characteristic physical quantity C of the environment of the actuator 1 presenting a temporal evolution E, and in particular a periodic, a pseudo-periodic or a harmonic temporal evolution.

Afterwards, the method comprises a second step b) of collecting a set of measurement values VCm related to the at least one characteristic physical quantity C of the environment of the actuator over a measurement interval Tm, each measurement value VCm being associated to a time tm of the measurement interval Tm.

In the case where the at least one characteristic physical quantity C of the environment of the actuator 1 comprises one or several action(s) of a user, these measurement values VCm may, for example, correspond to time-stamped values of inputs provided by the user via the user interface during an input interval Tm.

Thus, the measurement values VCm collected during the measurement interval Tm are stored in the storage means 5 in association with their measurement time tm comprised in that measurement interval Tm.

These measurement values VCm allow highlighting an observed temporal evolution Eo of the characteristic physical quantity C.

The measurement interval Tm is comprised in the period during which the at least one characteristic physical quantity C of the environment of the actuator 1 presents a temporal evolution E.

Afterwards, the method comprises a third step c) of determining or correcting at least one value VP of the at least one modeling parameter P so that a modeled or estimated temporal evolution Ee, defined from the application of the model M to the at least one value VP of modeling parameter P, corresponds to or approaches an observed temporal evolution Eo of the characteristic physical quantity C determined from the set of measurement values VCm.

The first value VP may also be determined or corrected.

The first value VP is determined when the parameter P, which may influence the modeled or estimated temporal evolution Ee, is not defined yet.

The first value VP is corrected when the parameter P, which may influence the modeled or estimated temporal evolution Ee, is predefined, the first value VP may then correspond to a predetermined default value.

Once the first value VP of the at least one parameter P is determined, the next values VP of the at least one parameter P correspond to corrections of the previous values VP of the at least one parameter P.

As mentioned previously, step b) allows highlighting an observed temporal evolution Eo of the characteristic physical quantity C from measurement values VCm provided by the sensor 3.

The application of the model M defined in step a) to values Vp of parameters P allows, in turn, highlighting a modeled or estimated temporal evolution Ee of the characteristic physical quantity C.

Hence, step c) comprises varying the at least one value VP of the at least one modeling parameter P until the modeled or estimated temporal evolution Ee corresponds or is close to the observed temporal evolution Eo.

The at least one value VP of the at least one parameter P may influence the temporal offset between the modeled or estimated temporal evolution Ee and the measured temporal evolution Eo but may also influence the amplitude of the modeled values of the characteristic quantity C.

Advantageously, at this stage, the method comprises a signal processing step, in particular a derivative calculation or filtering step, on the set of measurement values Vm of the at least one characteristic quantity C.

In particular, the performed processing operations may comprise:
  applying a high-pass filter in order to determine the <<roughness>> of the signal constituted by the measurement values VCm;
  applying a low-pass filter so as to identify diurnal alternations in the signal; and/or
  carrying out a derivative calculation on a curve deduced from the measurement values VCm so as to identify breaks of slopes.

In a subsequent step, calculation of the average and the standard deviation of the deviations of the patterns with a 24 hour periodicity may be carried out.

These first calculations allow defining first potential estimated values VP for the parameters P of the model M.

Considering the massive amount of used data as well as measurement errors which may occur and the quality of the used sensor 3, the determination and correction of the at least one value VP of the at least one parameter P preferably use a probabilistic algorithm rather than a deterministic algorithm in order to make the obtained data more precise.

In particular, an evolutionary algorithm, in particular a genetic-type algorithm, may be implemented to determine or correct the at least one value VP of the at least one parameter P.

To this end, a population of individuals I may be defined, each individual corresponding to a data structure combining at least one potential value VPp of the at least one parameter P. If several parameters P are defined, several potential values VPp are defined, for example one per parameter P.

The definition of this population may be defined, for a first generation of individuals, by a random drawing of values while taking into consideration starting values predefined by the signal processing type calculations on the collected measurements values VCm.

From this initial population, a performance function is evaluated for each individual.

This performance function may correspond, in particular, to the calculation of a deviation, for example a square deviation, between:
  a modeled temporal evolution Ee of the at least one characteristic quantity C defined by applying the model M to the at least one potential value VPp of the at least one parameter P, on the one hand, and
  the observed temporal evolution Eo of the characteristic physical quantity C determined from the set of measurement values VCm, on the other hand.

Depending on the chosen example, it is possible to select, in the population of individuals I, those whose the evaluation of the performance function F(I) corresponds to a lower deviation between the observed temporal evolution Eo and the modeled temporal evolution Ee.

It is then possible to define, from this selection, a second generation of individuals I by deducting new individuals by mutation of the selected individuals of the first generation by applying, for example, random modifications or by recombining several selected individuals of the first generation.

Afterwards, a new evaluation of this second generation is carried out followed by a new selection.

It is possible to carry on this evolution until fulfilling a stopping criterion corresponding, for example, to a given threshold of value of the performance function F.

This approach allows defining or correcting the at least one value of parameter VP depending on an individual corresponding to the result of the evolutionary algorithm and hence presenting a satisfactory value of the performance function.

Finally, the method comprises a fourth step d) of applying or correcting a definition of an operation of the actuator 1 depending on the at least one value VP of the at least one parameter P determined or corrected at step c).

This definition of an operation of the actuator 1 may comprise, for example, the definition of a command R for positioning the movable equipment 2.

Positioning of the movable equipment 2 is performed by the motor 6 of the actuator 1 which is controlled by the control means 4.

Thus, the control means 4 use the at least one value VP of the at least one parameter P, determined or corrected at the previous step, to apply or correct a definition of a command R for positioning the movable equipment 2.

Three examples of application of a method according to the invention will now be described.

According to a first implementation of a method according to the invention, a building movable equipment 2 of the hinged shutter type is considered. The actuator 1 associated to this movable equipment 2 is equipped with an insolation sensor 3.

The insolation sensor 3 is disposed so that its orientation with respect to the facade of the building on which it is installed, is known.

In general, this orientation of the sensor 3 corresponds to the same geographical orientation as that of the facade of the building on which it is installed.

For example, this sensor 3 is in the form of a photovoltaic panel, used for the measurement and for the proper power supply of the sensor 3. The current record at the terminals of the panel allows representing the insolation received by the panel, which is hence similar to the measured characteristic physical quantity C.

The parameters P that are considered in this example are relative to the date and hour of the year, and to the orientation of the sensor 3, the model M in this example establishing the relationship between an insolation physical quantity C and a parameter P of orientation of the sensor 3. In particular, this model M integrates the rule according to which the average insolation varies over a day in a fixed point of terrestrial globe.

For a sensor 3 oriented to the East, the maximum insolation will occur in the morning and for a sensor 3 oriented to the West, the maximum insolation will occur in the afternoon.

The North will receive direct insolation only but early in the morning or late in the evening in summer.

FIG. 3 illustrates the measurement values representative of insolation VCm, collected over a measurement interval Tm extending over one day, using a physical sensor 3 installed on the left field of a window oriented Southeast.

In this graph, a first period T1 may be distinguished during which the sensor 3 does not detect any insolation since the sensor 3 is masked by the left field of the window.

This first period T1 is followed by a second period T2 during which the sensor 3 receives a shaving direct insolation, then by a third period T3 during which the sensor 3 is progressively masked by the upper field of the window.

Finally, the graph presents a last period T4 during which the sensor 3 receives a scattered insolation.

The maximum insolation is reached between the second period T2 and the third period T3.

During the third step c) of the method according to the invention, a value VP of the parameter P of orientation of the sensor 3 is determined, for which the application of the model M corresponds to a modeled temporal evolution Ee approaching the observed temporal evolution Eo on the graph of FIG. 3 over the measurement interval Tm during which the set of measurement values VCm have been collected.

The orientation of the sensor 3 is then determined relative to the determined value VP of this parameter P.

Once this orientation is determined or corrected, the control means 4 apply or correct a definition of a command R for positioning, for example for triggering solar protection scenarios comprising the correction of a triggering schedule of a positioning command, in particular a command for opening or closing a movable equipment such as a shutter or a blind.

Once determined, the orientation of the sensor 3 may also be used to apply or correct other definitions of the positioning control for other actuators of shutters disposed either on the same facade of the building as the sensor 3, or on other facades whose orientation, with respect to the facade on which the sensor 3 is installed, is known.

Afterwards, the method may be implemented again during a measurement interval Tm+1, subsequent to the measurement interval Tm, for example during the next day, so as to refine, confirm, reject or not take into account the precision of the orientation determined the day before.

Indeed, this first orientation should not be taken into account or it should be rejected if, during later measurement intervals Tm+x, this first orientation appears as incoherent, that is to say that this orientation does not converge toward the same orientation toward which the application of the method seems to converge during these later measurement intervals Tm+x.

Of course, reject of the orientation may concern any one of the measurement intervals Tm+x.

However, the more measurement intervals Tm+x over which the method is applied, and the more the precision of the determined orientation will become significant.

The average time duration of daytime varies sinusoidally over the year, the method according to the invention also allows following the temporal progression of daytime over the year and hence deduce the date of the year.

Hence, the model M takes into account at least one harmonic modeling of the evolution of the at least one characteristic physical quantity C over a temporal evolution E time period which may, for example, range from one day to one year, and even several years.

According to a second implementation of a method according to the invention, a building movable equipment 2 of the hinged shutter type is considered. The actuator 1 associated to the equipment comprises a temperature sensor 3.

In this case, the model M establishes the relationship between a temperature physical quantity C and a combination of parameters comprising the thermal resistance of a shutter 2, the opening and closing times of a shutter 2 and a harmonic modeling of the average temperature comprising a 24 hour time period, an annual time period and a time period in the order of a few days.

Figure 4:
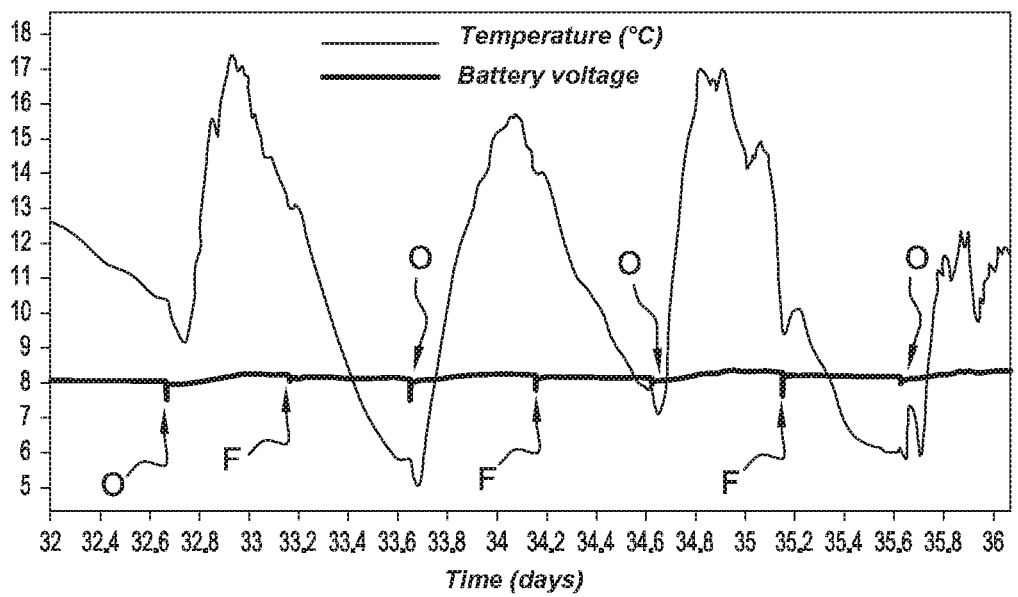
FIG. 4 is a graph illustrating an example of collection of a set of measurement values of temperature carried out during a determined measurement interval.

FIG. 4 illustrates the measurement values of temperature VCm collected over a measurement interval Tm extending over several days using a temperature physical sensor 3 placed between the shutter 2 and the window.

The graph of FIG. 4 also indicates the voltage of a battery supplying the actuator 1 of the shutter 2 so as to identify on the graph the voltage drops caused by the command R of the actuator 1 when opening O or closing F the shutter 2.

Thus, it is noted that each opening O of the shutter 2 in the morning is accompanied by a brief temperature drop measured by the sensor 3, and that each closure F in the evening is accompanied by a brief temperature stabilization.

The used model M integrates these phenomena of temperature drop and stabilization.

Similarly, the study of the slopes of the curve after opening of the shutter 2 and after closing of the shutter 2 allows deducing the thermal resistance of the shutter 2.

The value of these two parameters, corresponding to the thermal resistance of the shutter 2 and to the times of opening/closing of the shutter 2, is determined or corrected during the third step c) so as to obtain a modeled temporal evolution Ee corresponding or close to the observed temporal evolution Eo on the graph of FIG. 4.

According to a third implementation of a method according to the invention, a building movable equipment 2 of the external venetian blind type is considered. The actuator 1 associated to the equipment comprises an insolation sensor 3.

In this case, the model M establishes the relationship between an insolation physical quantity and a combination of a first parameter P1 of the geographical position of the sensor 3 defined by its latitude and its longitude, a second parameter P2 of orientation of the sensor 3 with respect to the sun or azimuth and a third parameter P3 of the solar time.

Figure 5:
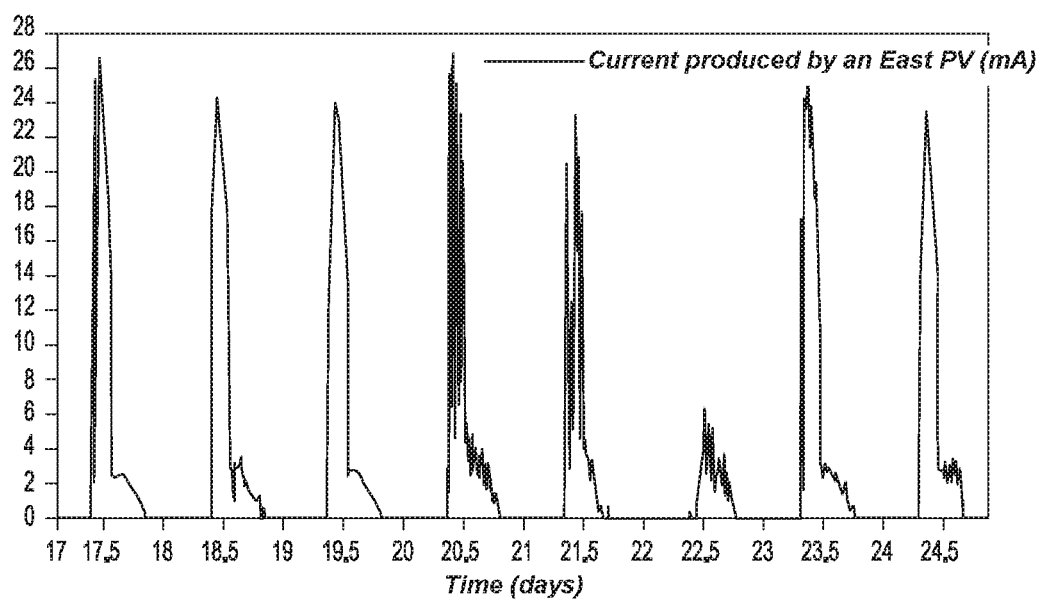
FIG. 5 is a graph illustrating another example of collection of a set of measurement values, representative of insolation, carried out during a determined measurement interval.

FIG. 5 illustrates the measurement values representative of insolation VCm, collected over a measurement interval Tm extending over several days, using a physical insolation sensor 3 placed outside.

The geographical position of the sun as well as the orientation of the sensor 3 have an influence on the amplitude of the collected measurement values of the observed evolution Eo.

The solar time as well as the orientation, in turn, have an influence on the position over time of the observed evolution Eo.

The used model M integrates the position of the intensity peaks.

Thus, it is possible to deduce, from the graph of FIG. 5, an orientation of the sensor 3 from the position, over an interval corresponding to each day, of the different peaks of the measured intensity during a measurement interval Tm corresponding to one week.

This graph may also allow determining a period of the year to which this measurement week belongs by observing the offset of the different peaks during this measurement week. Indeed, the position of the different peaks over several successive days seems to present an offset which increases to the left, which may indicate that the sun rises earlier and hence the measurement interval Tm is located between the winter solstice and the summer solstice.

In this graph, the measurements that have been observed during the 22nd day will not be taken into account because of the low intensity that has been recorded, which may be indicative of bad weather at that day.

According to a fourth example which is not represented in the Figures, the set of measurement values comprises measurement values related to actions of the user corresponding to control instructions input by the user. In particular, these instructions may correspond to commands for opening and closing a shutter by the user. The opening and closing times allow deducing the insolation time ranges of a window equipped with the shutter.

According to a variant of this example, it is possible to combine measurement values collected by a physical sensor and values arising from the behavior of the user in order to deduce values of the at least one physical quantity, for example insolation.

Although the invention has been described in connection with particular embodiments, it goes without saying that it is not limited thereto and that it comprises all technical equivalents of the described steps.

Thus, to carry out the third step c), the method may use a probabilistic algorithm comprising an algorithm of the simulated annealing type or still a Bayesian inference.

The invention claimed is:

1. A method for controlling an actuator of a building movable equipment comprising:
   a) Providing a model relating at least one modeling parameter to at least one characteristic physical quantity of the environment or the operation of the actuator which presents a temporal evolution,
   b) Collecting a set of measurement values related to the at least one characteristic physical quantity of the environment or the operation of the actuator during a measurement interval, each measurement value being associated to a time of the measurement interval;
   wherein the set of measurement values comprises complementarily to the values collected by a physical sensor, measurement values related to actions of the user that correspond to control instructions input by the user;
   c) Correcting at least one value of the at least one modeling parameter so that a modeled temporal evolution defined from the application of the model to the at least one value of the modeling parameter corresponds or is close to an observed temporal evolution of the characteristic physical quantity determined from the set of measurement values, including the measurement values related to actions of the user that correspond to control instructions input by the user;
   wherein step c) comprises varying the at least one value of the at least one modeling parameter until the modeled or estimated temporal evolution corresponds or is close to the observed temporal evolution;
   d) Applying or correcting a definition of an operation of the actuator depending on the at least one value of the at least one parameter corrected in step c),
   wherein step c) comprises the use of a probabilistic algorithm to vary at least one value of the at least one modeling parameter of the model;
   wherein the actions of the user and therefore the actions of the user that correspond to control instructions input by the user are measurement values used to initially determine an operation of the actuator or an element allowing to correct a control law established for the operation of the actuator.

2. The method according to claim 1, wherein the used model takes into account at least one harmonic modeling of the evolution of the at least one characteristic physical quantity.

3. The method according to claim 1, wherein the set of measurement values comprises values corresponding to a characteristic physical quantity of insolation.

4. The method according to claim 1, wherein the set of measurement values comprises values corresponding to a received solar power.

5. The method according to claim 1, wherein the set of measurement values comprises values corresponding to an ambient temperature.

6. The method according to claim 1, wherein the at least one parameter corresponds to an estimation of a geographical position.

7. The method according to claim 1, wherein the at least one parameter corresponds to an estimation of an orientation relative to a geographical reference frame.

8. The method according to claim 1, wherein the at least one parameter corresponds to an estimation of the hour or the date.

9. The method according to claim 1, wherein the probabilistic algorithm comprises an evolutionary algorithm which comprises a step of defining a population of individuals, each individual corresponding to a data structure combining potential values of the at least one parameter.

10. The method according to claim 9, wherein the evolutionary algorithm comprises a step of evaluating a performance function corresponding to calculating a deviation between:
   a modeled temporal evolution of the at least one characteristic quantity defined by applying the model to the at least one potential value of the at least one parameter, and
   the observed temporal evolution of the characteristic physical quantity determined from the set of measurement values,
   wherein the evolutionary algorithm comprises a step of selecting, in the population of individuals, those whose the evaluation of the performance function corresponds to a lower deviation between the observed temporal evolution and the modeled temporal evolution.

11. The method according to claim 9, wherein the step of definition of a population of individuals comprises a random drawing of values.

12. The method according to claim 1, wherein step c) comprises a signal processing step, on the set of measurement values of the at least one characteristic quantity.

13. The method according to claim 1, wherein step c) comprises a step of calculating the deviation of the patterns of a signal formed by the set of measurement values presenting a given periodicity.

14. The method according to claim 13, wherein the signal processing step is carried out prior to the application of a probabilistic algorithm.

15. The method according to claim 13, wherein the step of calculating the deviation of the patterns is carried out prior to the application of a probabilistic algorithm.

16. The method according to claim 15, wherein the probabilistic algorithm comprises an evolutionary algorithm which comprises a step of defining a population of individuals, each individual corresponding to a data structure combining potential values of the at least one parameter; and wherein the step of definition of a population of individual comprises a random drawing of values while taking into consideration starting values predefined in the signal processing step on the set of measurements values.

17. The method according to claim 1, wherein the definition of an operation of the actuator comprises the definition of a command for positioning the movable equipment.

18. The method according to claim 17, wherein the correction of the definition of a positioning command corresponds to the correction of a triggering schedule of a positioning command.

19. The method according to claim 17, wherein the step d) comprises:
   determining a relative orientation of the movable equipment with respect to the sun depending on the at least one parameter value; and
   applying a command for positioning the movable equipment depending on the determined relative orientation.

20. The method according to claim 1, wherein the definition of an operation of the actuator comprises the definition of a command for varying a speed of the actuator.

21. An actuator of a building movable equipment arranged to implement a control method according to claim 1 comprising a sensor arranged to collect measurement values of the at least one characteristic physical quantity.

22. An actuator of a building movable equipment arranged to implement a control method according to claim 1 comprising a user interface arranged to collect measurement values of the at least one characteristic physical quantity.

* * * * *